United States Patent [19]
Vega et al.

[11] Patent Number: 6,030,026
[45] Date of Patent: Feb. 29, 2000

[54] TENT ENCLOSURE FOR TRUCK BED

[76] Inventors: Pete B Vega; Richard Vega; George Vega, all of 7002 Basswood Pl., Rancho Cucamongo, Calif. 91739

[21] Appl. No.: 09/161,911

[22] Filed: Sep. 28, 1998

[51] Int. Cl.[7] ........................................................ B60P 3/34
[52] U.S. Cl. ........................ 296/159; 296/165; 135/88.13; 150/166
[58] Field of Search ..................................... 296/171, 159, 296/164, 165, 167, 175; 135/88.01, 88.05, 88.07, 88.09, 88.13, 88.15, 88.16; 150/166

[56] References Cited

U.S. PATENT DOCUMENTS

| | | | |
|---|---|---|---|
| 4,205,695 | 6/1980 | Stoddard | 135/1 |
| 5,213,390 | 5/1993 | Borchers | 296/165 |
| 5,335,960 | 8/1994 | Benignu, Jr. | 296/165 |
| 5,558,392 | 9/1996 | Young | 296/157 |
| 5,758,679 | 6/1998 | Tamburelli | 135/88.09 |
| 5,924,761 | 6/1999 | Harrison | 296/159 |

*Primary Examiner*—Dennis H. Pedder
*Assistant Examiner*—Mickki D. Murray
*Attorney, Agent, or Firm*—Golstein & Canino

[57] ABSTRACT

A tent enclosure for use with a pickup truck having an open cargo bed, upstanding side walls, and a rigid, flat tonneau cover pivotally connected near a front end of the upstanding side walls, comprising a one-piece flexible covering having a main sleeve section, two side sections, and a rear section extending from the sleeve section along the side and rear edges thereof, respectively. The sleeve section comprises a pair of opposed fabric panels affixed together along the side and rear edges thereof to form an interior compartment for receiving the tonneau cover. The tent enclosure is supported in its raised condition by inserting the tonneau cover into the interior compartment of the sleeve section, and supporting the tonneau cover in an inclined position with two support poles placed between the tonneau cover and the cargo bed of the truck. The side sections are lowered and secured to the truck by means of a plurality of elastic cords with hooks extending downward from the side sections. The rear section is pulled down, wrapped around the truck's tailgate, and joins together with the side sections to form a tent enclosure.

8 Claims, 3 Drawing Sheets

TENT ENCLOSURE FOR TRUCK BED

BACKGROUND OF THE INVENTION

This invention relates to a tent enclosure for use with pickup trucks having an open cargo bed and a tonneau cover pivotally connected to the truck, for covering the open cargo bed. More particularly, the invention relates to a tent enclosure employing a one-piece flexible covering having a main sleeve section adapted to receive the tonneau cover, two side sections, and a rear section, which are joined together to form an enclosure in the back of a pickup truck.

A variety of portable tents have been proposed for use by campers, hikers, and the like, and have become increasingly popular since they are highly effective in protecting their occupants from various weather conditions while camping overnight. However, when the ground is rocky, muddy, uneven, or covered in tall grass, it is often impracticable to erect a conventional tent in such an area since most tents are designed to rest directly on the ground surface. Thus, it is desirable to have a tent enclosure that can be utilized even when suitable ground for erecting a conventional tent is unavailable.

Accordingly, in an attempt to solve problems associated with unsuitable ground conditions, several references uncovered in the prior art describe various tent arrangements which affix directly onto the cargo bed of pickup trucks. For example, U.S. Pat. No. 5,213,390 to Borchers discloses a vehicle mountable shelter which is configurable to provide a cargo carrying area, or a lodging area for camping. Likewise, U.S. Pat. No. 5,335,960 to Benignu discloses a construction of cloth for attachment to a truck bed serving as a tonneau cover and protective enclosure for humans. U.S. Pat. No. 5,558,392 to Young discloses a boat which also serves as a camper shell. When combined with tent material, it provides a tent-like enclosure.

Despite all these vehicle mountable tent assemblies, there is still a further need to provide an improved tent enclosure for pickup trucks having an open cargo bed, and a rigid, flat tonneau cover pivotally connected to the side walls of the truck. Such a tent enclosure should be easy and quick to install and remove from a pickup truck, and yet be capable of protecting occupants thereof from various weather conditions. Moreover, such a tent enclosure should be capable of being firmly secured to the tonneau cover so as to enhance its ability to resist strong winds and the like without having to use separate staking devices.

While these units mentioned above may be suitable for the particular purpose employed, or for general use, they would not be as suitable for the purposes of the present invention as disclosed hereafter.

SUMMARY OF THE INVENTION

It is an object of the invention to provide a tent enclosure for use with pickup trucks which is simple in construction so as to minimize manufacturing cost, and yet is effective in protecting occupants thereof from various weather conditions while camping overnight.

It is another object of the invention to provide a tent enclosure which can be easily and quickly secured to and removed from a pickup truck having an open cargo bed, and a rigid, flat tonneau cover pivotally connected near a front end of the upstanding side walls of the truck.

It is yet another object of the invention to provide a tent enclosure which includes a sleeve section having an interior compartment configured to receive the tonneau cover so that the tent enclosure can be secured thereto and resist the effects of strong winds.

It is a further object of the invention to provide a tent enclosure which, when not being used, can be folded into a flat, compact bundle for easy transportation and storage in limited space.

The invention is a tent enclosure for use with a pickup truck having an open cargo bed, upstanding side walls, and a rigid, flat tonneau cover pivotally connected near a front end of the upstanding side walls, comprising a one-piece flexible covering having a main sleeve section, two side sections, and a rear section extending from the sleeve section along the side and rear edges thereof, respectively. The sleeve section comprises a pair of opposed fabric panels affixed together along the side and rear edges thereof to form an interior compartment for receiving the tonneau cover. The tent enclosure is supported in its raised condition by inserting the tonneau cover into the interior compartment of the sleeve section, and supporting the tonneau cover in an inclined position with two support poles placed between the tonneau cover and the cargo bed of the truck. The side sections are lowered and secured to the truck by means of a plurality of elastic cords with hooks extending downward from the side sections. The rear section is pulled down, wrapped around the truck's tailgate, and joins together with the side sections to form a tent enclosure.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
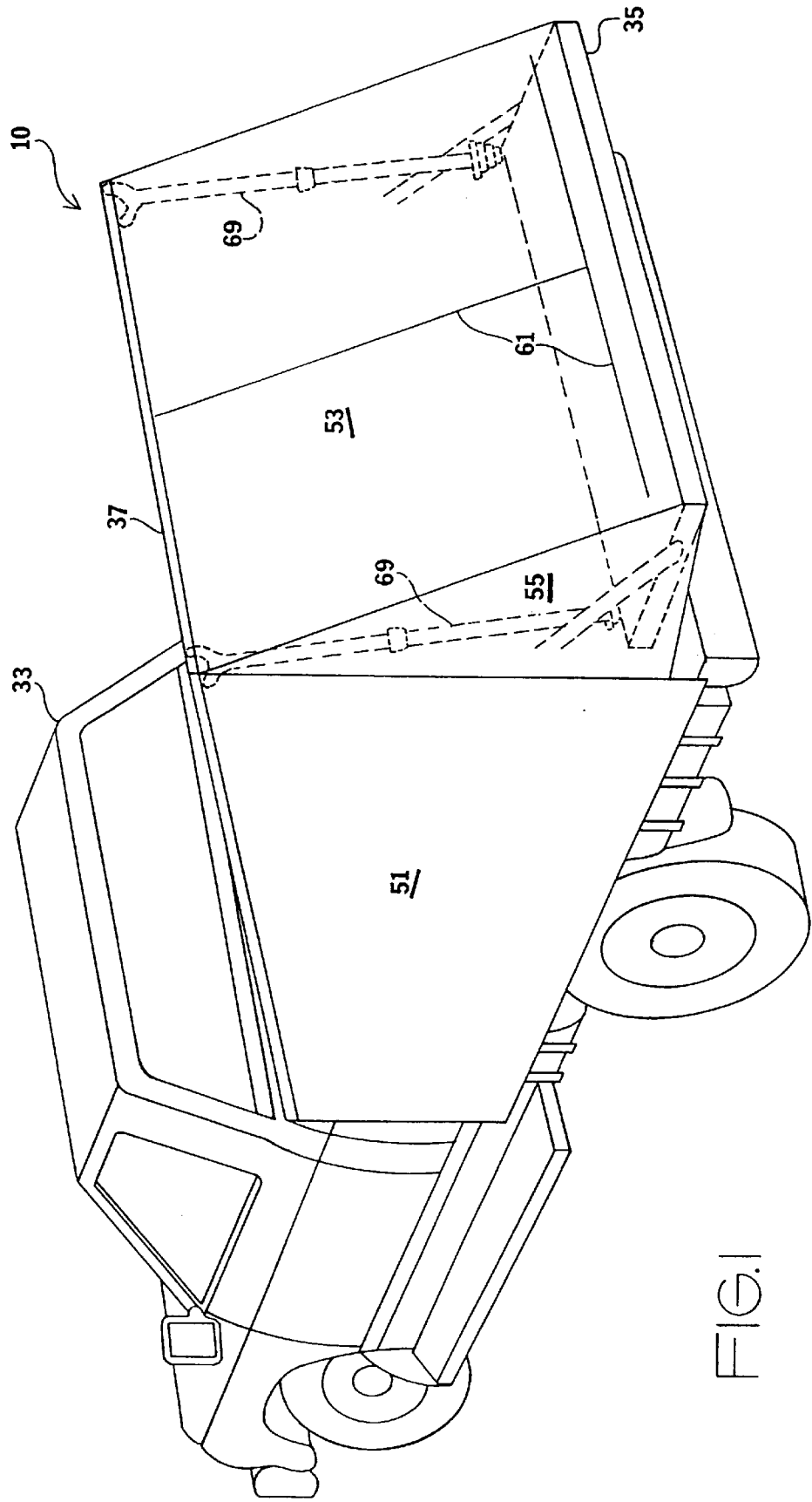
FIG. 1 is a diagrammatic perspective view of a tent enclosure being secured to a pickup truck in accordance with the principles of the present invention.

FIG. 1 illustrates a preferred embodiment of a tent enclosure 10 being used in accordance with the present invention. For a better understanding of the present invention, a conventional pickup truck 33 is illustrated having a tailgate 35, an open cargo bed, upstanding side walls, and a rigid, flat tonneau cover 37 pivotally connected near a front end of the upstanding side walls for covering the open cargo bed.

Figure 2:
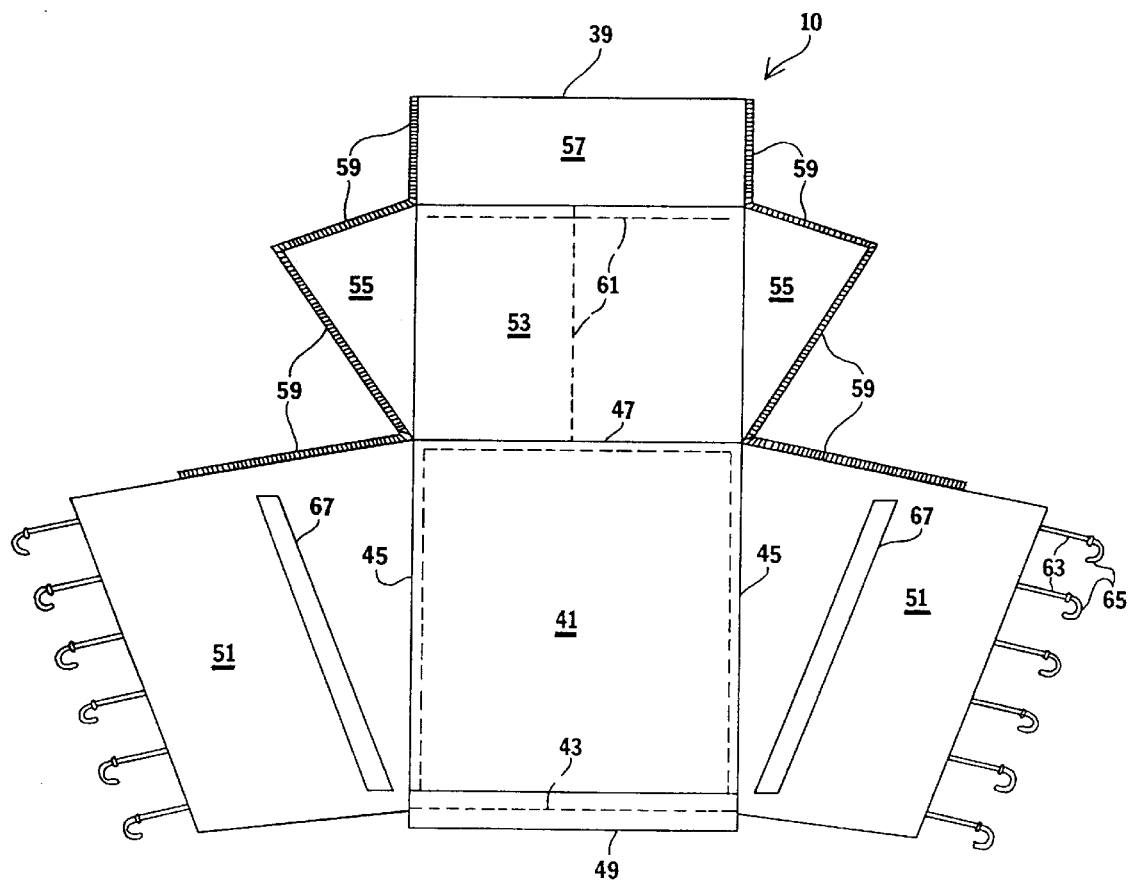
FIG. 2 is a plan view of a preferred embodiment of the tent enclosure in a completely unfolded configuration.

FIG. 2 illustrates the tent enclosure 10 in a completely unfolded configuration comprising a flexible covering 39 which can be constructed of a synthetic nylon tent material or any other suitable water resistant material. The flexible covering 39 includes a main sleeve section 41 having a substantially rectangular configuration, which is defined in part by front 43, side 45, and rear 47 edges. The sleeve section 41 includes a pair of opposed fabric panels affixed together along the side 45 and rear 47 edges thereof to form an interior compartment, which is sized and shaped to receive the tonneau cover 37. The sleeve section 41 is completely enclosed except for an open front end 43 through which the tonneau cover 37 is inserted into and removed from. A front flap 49 extends from the sleeve section 41 along its front edge 43 for preventing water from flowing into the tent enclosure during inclement weather.

The flexible covering 39 also includes side sections 51 extending from the side edges 45 of the sleeve section 41, a rear section 53 extending from the rear edge 47 of the sleeve section 41, a pair of triangular sections 55 extending from the side edges of the rear section 53, and a tailgate flap 57 extending from the bottom edge of the rear section 53. The triangular sections 55 and the side edges of the tailgate flap 55 have peripheral edges which are provided with zippers 59 such that when the rear section 53 is pulled down with the tailgate flap 57 wrapped underneath the tailgate 35, these parts together with the triangular sections 55 can be secured around the truck's tailgate by closing the zippers 59, as depicted in FIG. 1. The side section 51 is provided with zippers 59 along the edges adjacent to the triangular sections 55 such that the triangular sections and the side sections can be joined together to form an enclosure. The rear section 53 is provided with a zippered entrance opening 61 to permit entry into and exit from the tent enclosure 10.

A plurality of elastic cords 63 with hooks 65 extend downward from the side sections 51 for securing the tent enclosure to the truck. A magnetic strip 67 is provided on each of the side sections 51 for releasably attaching the side sections to the exterior metal surface of the truck 33. The magnetic strip 67 can be affixed to the side sections 51 by means of adhesive or any other affixing means as would be appreciated by those skilled in the art.

Figure 3:
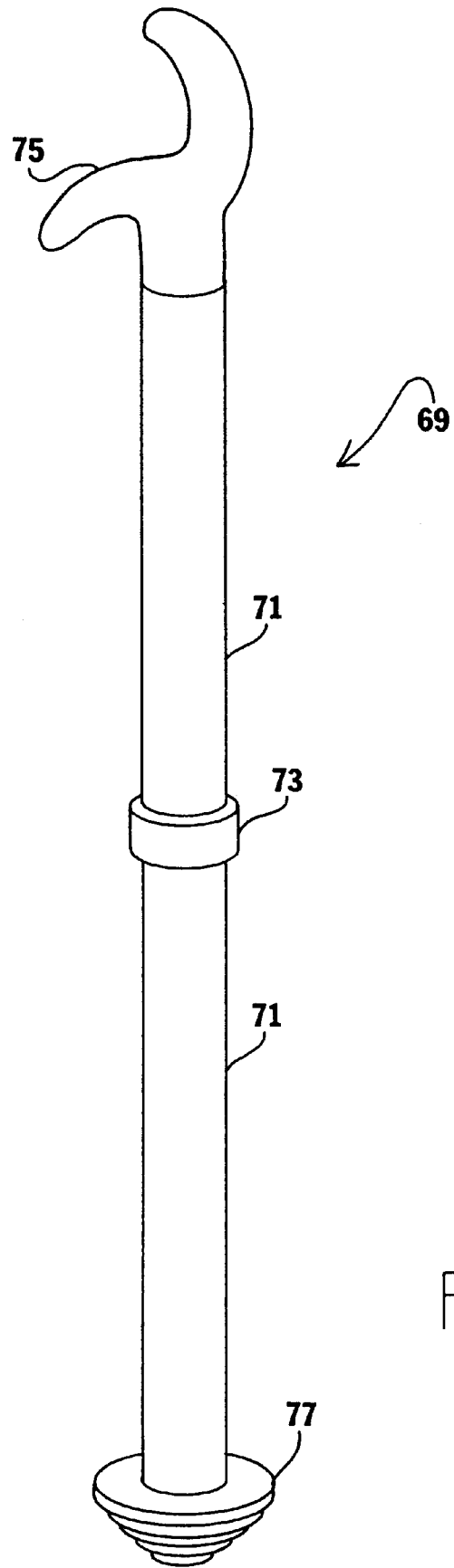
FIG. 3 is a diagrammatic perspective view of a support pole of the present invention.

Referring back to FIG. 1, the tent enclosure 10 of the present invention further includes two support poles 69 for supporting the tonneau cover 37 in an inclined position. FIG. 3 illustrates a preferred embodiment of a support pole 69 having two telescopic parts 71, one sliding inside the other, and adjustment means 73 for selectively adjusting the length thereof and limiting the telescopic movement of the telescopic parts when a desired length has been selected. The support pole 69 includes a curved L-shaped handle 75 mounted to the top end thereof which is coated with rubber material so that it can grip onto the tonneau cover 37, and a rubber shoe 77 mounted the bottom end thereof for firmly gripping the floor surface of the truck bed.

The operation of the tent enclosure 10 will now be described. When the time to install the tent enclosure arrives, the tailgate 35 of the truck 33 is fully lowered to its horizontal position to provide an additional support surface for the occupants of the tent enclosure. The tent enclosure is supported in its raised condition as shown in FIG. 1, by inserting the tonneau cover 37 into the interior compartment of the sleeve section 41, and supporting the tonneau cover in an inclined position with the two support poles 69 placed between the tonneau cover and the cargo bed. In this manner, the tonneau cover provides rigidity for the sleeve section 41 to provide a sturdy "roof" for the tent enclosure. After which, the side sections 51 are lowered and secured to the truck by extending the elastic cords 61 and attaching the hooks 65 at the end thereof to the side walls of the truck. The rear section 53 is pulled down with the tailgate flap 57 wrapped underneath the tailgate, which are secured around the truck's tailgate by closing the zippers 59 between the triangular sections 55 and the tailgate flap. Whereupon, the triangular sections are joining with the side sections to form an enclosure. The tent enclosure can be taken down and formed into a compact bundle for easy transportation and storage in a limited space.

Many specific details contained in the above description merely illustrate some preferred embodiments and should not be construed as a limitation on the scope of the invention. Many other variations are possible.

What is claimed is:

1. A tent enclosure for use with a pickup truck having an open cargo bed, upstanding side walls, and a flat, rigid cover pivotally connected near a front end of the upstanding side walls, comprising:
   a) a sleeve section having a substantially rectangular configuration which is defined in part by front, side, and rear edges, said sleeve section including a pair of opposed fabric panels affixed together along said side and rear edges thereof to form an interior compartment sized and shaped to receive the flat, rigid cover;
   b) a pair of side sections extending from the side edges of the sleeve section, said side sections having securing means for securing said side sections to the truck;
   c) a rear section extending from the rear edge of the sleeve section, said rear section releasably joined together with said side sections to form an enclosure, said rear section having an entrance opening for permitting entry into and exit from the tent enclosure; and
   d) at least one support pole for supporting the flat, rigid cover in an inclined position.

2. The tent enclosure as recited in claim 1, wherein the rear section is defined in part by two side edges and a bottom edge, said tent enclosure further comprising a pair of triangular sections extending from said side edges of the rear section, and a tailgate flap extending from said bottom edge of the rear section, said triangular sections and said tailgate flap releasably joined together with the side sections to form an enclosure.

3. The tent enclosure as recited in claim 2, wherein the securing means comprises a plurality of elastic cords with hooks extending downward from the side sections.

4. The tent enclosure as recited in claim 3, wherein the support pole comprises:
   a) two telescopic parts, one sliding inside the other,
   b) adjustment means for selectively adjusting the length thereof and limiting the telescopic movement of the telescopic parts when a desired length is selected;
   c) a curved handle mounted to one end of the telescopic parts for gripping onto the flat, rigid cover; and
   d) a rubber shoe mounted to the other end of the telescopic parts for gripping floor surface of the cargo bed.

5. The tent enclosure as recited in claim 4, further comprising at least one magnetic strip provided on each of the side sections for releasably attaching to the exterior metal surfaces of the truck.

6. A method of forming a tent-like enclosure on an open cargo bed of a pickup truck having upstanding side walls, and a flat rigid cover pivotally connected near a front end of the upstanding side walls, with a flexible covering comprising a rectangular sleeve section defined in part by front, side, and rear edges, said sleeve section including a pair of opposed fabric panels affixed together along said side and rear edges thereof to form an interior compartment sized and shaped to receive the flat rigid cover, said flexible covering further comprising a pair of side sections extending from the side edges of the sleeve section and a pair of support poles, said method comprising steps of:
   a) inserting the tonneau cover into the interior compartment of the sleeve section;
   b) supporting the flat rigid cover in an inclined position with the support poles placed between the cover and the cargo bed; and c) draping the side sections over the upstanding side walls of truck to form an enclosure.

7. The method as recited in claim 6, wherein the flexible covering further comprises a plurality of elastic cords with hooks extending downward from the side sections, said method further comprising steps of:
   a) securing the side sections to the truck by extending the elastic cords and attaching the hooks at the end thereof to the side walls of the truck.

8. The method as recited in claim 7, wherein the flexible covering further comprises a rear section extending from the rear edge of the sleeve section, said method further comprising steps of:
   a) draping the rear section over tailgate of the truck; and
   b) joining the rear section together with the side sections to form an enclosure.

\* \* \* \* \*